United States Patent [19]
Hayashi

[11] Patent Number: 6,026,365
[45] Date of Patent: Feb. 15, 2000

[54] WORKFLOW SUPPORT SYSTEM AND METHOD OF THE SAME

[75] Inventor: Shoichi Hayashi, Nakai-machi, Japan

[73] Assignee: Fuji Xerox Co., Ltd., Tokyo, Japan

[21] Appl. No.: 08/912,641

[22] Filed: Aug. 18, 1997

[30] Foreign Application Priority Data

Aug. 20, 1996 [JP] Japan .................................. 8-218743

[51] Int. Cl.[7] .................................................. G06F 17/60
[52] U.S. Cl. ...................................... 705/9; 705/7; 700/99
[58] Field of Search ................. 705/7, 8, 9; 364/468.05, 364/468.06; 700/99, 100

[56] References Cited

U.S. PATENT DOCUMENTS

| | | | |
|---|---|---|---|
| 4,829,445 | 5/1989 | Burney | 364/478.18 |
| 5,172,328 | 12/1992 | Cahlander et al. | 364/477.05 |
| 5,535,322 | 7/1996 | Hecht | 705/1 |
| 5,557,515 | 9/1996 | Abbruzzese et al. | 705/9 |
| 5,832,455 | 11/1998 | Hayashi et al. | 705/7 |
| 5,848,271 | 12/1998 | Caruso et al. | 395/680 |

FOREIGN PATENT DOCUMENTS

A8-101817  4/1996  Japan .

OTHER PUBLICATIONS

Hayashi, Shoichi et al., "Work Flow Support System", JPO Patent Publication 8-101817 translated, Apr. 16, 1996.

Primary Examiner—Allen R. MacDonald
Assistant Examiner—Michele Stuckey Crecca
Attorney, Agent, or Firm—Oliff & Berridge, PLC

[57] ABSTRACT

The invention provides a workflow support system and a method of the same that enables to refer to and to trace the history and progress state of the control information, as to a workflow transferring into a different system and an atypical task. The data base contains a task control information for executing a workflow, and the conversion unit converts a task information into a task sheet being an electronic document, which is stored in the document data base or the open document server. The task control information contains a relation between the tasks and a pointer indicating a storage location of a task sheet corresponding to the task, and the pointer is contained also in the task sheet. The task sheets are linked by this pointer. Tracing this pointer makes it possible to refer to the task sheets of the tasks involved, to grasp the progress state, and further to trace the task sheets involved.

32 Claims, 11 Drawing Sheets

FIG. 3A

| PROCESS TABLE | |
|---|---|
| TASK-ID | PARENT-TASK-ID |
| | |

FIG. 3B

| VARIABLE TABLE | | |
|---|---|---|
| TASK-ID | VARIABLE NAME | AREA-ID |
| | | |

FIG. 3C

| TASK TABLE | | | | | | | | |
|---|---|---|---|---|---|---|---|---|
| TASK-ID | TASK-NAME | EXECUTOR/PERSON IN-CHARGE | REQUESTER/WHOM-TO-REPORT | INPUT/REFERENCE-DOCUMENT | OUTPUT-DOCUMENT | REMARK/SESSION | STATUS | START/COMPLETE/DEADLINE |
| | | | | | | | | |

```
< body >
< task-id > % task-ID % < /task-id >
< title > task-name: % task-name % < /title >
< task-started > task-start-date: % start-date % < /task-started >
< task-deadline > task-deadline: % deadline % < /task-deadline >
< task-completed > task-completed-date: completed-date < /task-completed >
< task-status > task-status: status % < task-status >
< executor > person-in-charge: % execution % / person-in-charge %
< executor >
< director > whom to report: % requestor/whom-to-report % < director >
< hr >
Input/Reference Document: < br >
< a href=" % Input/Reference-Document % "> % Input/Reference-Document %
< /a >
< p >
Output/ Report document: < br >
< a href = " % Output-document % > % Output-document-name % < /a >
< p >
< hr >
Remark: < br >
< a href = " % Remark / Session % " % Remark/ Session-title % < /a >
< p >
< hr >
Upper task: < br >
< a href= " % Parent-task-ID %" > % parent-task-name % < /a >
< p >
Lower task < br >
< a href = " % Child-task-ID % "> % child-task % < /a >
< p >
< /body >
```

FIG.4

| | |
|---|---|
| TASK NAME: | SPECIFICATION DRAFTING ALLOCATED TO Y CORP. |
| TASK-STARTED: | · 96/4/10 15:00 |
| TASK-DEADLINE: | · 96/4/30 17:00 |
| TASK-COMPLETED: | |
| TASK STATUS: | WAITING FOR EXECUTION |

EXECUTOR:
- ROLE: PERSON IN CHARGE, Y CORP.:
- NAME: B

WHOM TO REPORT
- ROLE: CHIEF X CORP.:
- NAME: A

INPUT/REFERENCE DOCUMENT: POLICY INSTRUCTION PAPER (DOC:X.201)

OUTPUT/REFERENCE DOCUMENT: Y CORP.-ASSIGNED SPECIFICATION (DOC:Y.432)

REMARK/SESSION

WE WOULD LIKE YOU TO HANDLE THIS MATTER AS YOU THINK FIT
THERE IS A QUESTION. (Y CORP. B)
POLICY TO COMPLETE THE TASK IS PRESENTED IN "POLICY INSTRUCTION PAPER". PLEASE COMPLETE YOUR ASSIGNMENT, REFERRING TO THIS POLICY, AND STORE THE REPORT IN OUTPUT/REPORT AREA.

UPPER TASK:
SPECIFICATION DRAFTING
SPECIFICATION DRAFTING
FOR Y CORP. NEW PRODUCT

LOWER TASK:
PROPOSAL TO Y CORP.-
ASSIGNED TASK

FIG.6

PROCESS TABLE

| TASK-ID | PARENT-TASK-ID |
|---|---|
| TASK:X.100 | TASK:X.96 |
| TASK:X.101 | TASK:X.100 |
| TASK:X.102 | TASK:X.100 |
| TASK:X.103 | TASK:X.100 |
| TASK:Y.71 | TASK:X.103 |
| TASK:X.103 | TASK:Y.123 |

VARIABLE TABLE

| TASK-ID | VARIABLE NAME | AREA-ID |
|---|---|---|
| TASK:X.101 | V | AREA:X.101.V |
| TASK:X.102 | U | AREA:X.101.V |
| TASK:X.102 | V | AREA:X.102.V |
| TASK:X.102 | W | AREA:X.102.W |
| TASK:X.103 | V | AREA:X.101.V |
| TASK:X.103 | W | AREA:X.103.W |
| TASK:Y.71 | V | AREA:Y.71.V |

CONTENTS STORED IN AREAS

TASK TABLE

| TASK-ID | TASK-NAME | EXECUTOR/ PERSON-IN-CHARGE | REQUESTER/ WHOM-TO-REPORT | INPUT/ REFERENCE-DOCUMENT | OUTPUT-DOCUMENT | REMARK/ SESSION | STATUS |
|---|---|---|---|---|---|---|---|
| TASK:X.100 | SPECIFICATION DRAFTING | X.A | X.T | | | | EXECUTING |
| TASK:X.101 | POLICY INSTRUCTION FOR DRAFTING | X.A | X.A | | ?V | | EXECUTING |
| TASK:X.102 | X CORP.-ASSIGNED SPECIFICATION | X.C | X.A | ?U | ?V | ?W | COMPLETED |
| TASK:X.103 | Y CORP.-ASSIGNED SPECIFICTION | Y.B | X.A | ?V | ?W | | EXECUTING |
| TASK:Y.71 | PROPOSAL TO Y CORP.-ASSIGNED TASK | X.C | Y.B | | ?V | | WAITING FOR EXECUTION |

FIG.9

PROCESS TABLE

| TASK-ID | PARENT-TASK-ID |
|---|---|
| TASK:X.103 | TASK:X.100 |
| TASK:Y.71 | TASK:X.103 |
| TASK:X.103 | TASK:Y.123 |
| TASK:Y.124 | TASK:Y.123 |

VARIABLE TABLE

| TASK-ID | VARIABLE NAME | AREA-ID |
|---|---|---|
| TASK:X.103 | U | AREA:X.101.V |
| TASK:X.103 | V | AREA:X.103.W |
| TASK:Y.71 | V | AREA:Y.71.V |

CONTENTS STORED IN AREAS

TASK TABLE

| TASK-ID | TASK-NAME | EXECUTOR/ PERSON-IN-CHARGE | REQUESTER/ WHOM-TO-REPORT | INPUT/ REFERENCE-DOCUMENT | OUTPUT-DOCUMENT | REMARK/ SESSION | STATUS |
|---|---|---|---|---|---|---|---|
| TASK:X.103 | Y CORP.-ASSIGNED-SPECIFICATION | Y.B | X.A | ?U | ?V | | EXECUTING |
| TASK:Y.71 | PROPOSAL-TO-Y CORP.-ASSIGNED-TASK | X.C | Y.B | | ?V | | WAITING FOR EXECUTION |
| TASK:X.123 | Y CORP.-ASSIGNED-SPECIFICATION-FOR-NEW-MODEL | Y.K | Y.T | | | | EXECUTING |
| TASK:Y.124 | D -ASSIGNED-SPECIFICTION | Y.D | Y.K | | | | WAITING FOR EXECUTION COMPLETED |

FIG. 11

WORKFLOW SUPPORT SYSTEM AND METHOD OF THE SAME

BACKGROUND OF THE INVENTION

1. Field of the Invention

The present invention relates to a workflow support system for supporting group works and workflows in a distributed environment in which a plurality of information processing equipment are connected by a network.

2. Description of the Related Art

Generally, a workflow represents a flow of work. In a business corporation, for example, suppose that one of the members of the corporation is going to purchase an article. First, the person prepares a purchase slip and then brings the purchase slip to the superior. The superior checks the purchase slip, stamps the approval, and sends the purchase slip to the accounting department. Based on the purchase slip, the accounting department orders the article. As seen in the above-mentioned workflow, the purchase slip flows from the person to the superior, and from the superior to the accounting department, thus advancing the workflow.

Here, each of the work to make the purchase slip, the work to check the purchase slip and stamp the approval, and the work to order the article, etc. is a unit of work, and the unit of each work is called a task. Therefore, a workflow can be considered a sequence of task. A task can be further divided into sub-tasks. Tasks can be performed by persons as in the foregoing example, and can automatically be performed by computers as, for example, in a data base retrieval.

Owing to the recent spread of information processing equipment, distributed environments have been developed, in which information processing equipment such as terminal equipment are provided in each of work fields and these plural information processing equipment are connected by a network system. The users of the information processing equipment each are to perform the assigned work.

Generally, the control information of the tasks is stored, for example, as one record in a data base. Each task necessarily has a side to receive a request of the task and a side to request the task (or, a side to execute a task and a side to receive the report). If these two sides are separately located on different local networks or information processing equipments, the one record must be shared by the both sides.

A system to support a workflow that connects a plurality of information processing equipments and users in such a distributed environment has been developed. Since sharing the foregoing record has been difficult to be realized, an electronic mail, for example, is generally used. And, it is a common exercise that a request of a work is sent out by the electronic mail, and the report of the work is asked to be sent back. Namely, a workflow is defined by defining a distribution path of a document transmitted as an electronic mail. For example, in the foregoing purchase slip, a distribution path from the maker to the accounting department through the superior is defined. According to the definition, the system to support a workflow distributes a purchase slip as an electronic mail. Further, the system to support a workflow controls a distribution history and can display a distribution state by a graphical presentation to trace the progress state of the workflow. InterNotes (trademark) from Lotus Corp. is a system which converts an electronic document, such as an electronic mail distributed in a workflow, into a markup language and opens it to the Internet. Thereby, external networks can refer to the electronic document of the system.

In a system using an electronic mail, it is necessary to send an electronic mail in order to execute the subsequent task. However, if the address is not found or the address change due to a transfer or the like is not informed, the system cannot send the electronic mail; thus a workflow is forced to be stopped in some case. In order to solve such a problem, there is a work low support system disclosed, for example, in the Japanese Published Unexamined Patent Application No. Hei 8-101817. In this system, a workflow is described according to rules such as the predicate logic and the like, and tasks described in the rules are sequentially executed. A workflow is performed by using another rule on the execution process, or by applying the other rule to the task that could not have been executed.

However, in the conventional workflow support system, the control information on the distribution history of electronic mails and the progress state of workflows is controlled to be closed in a data base for controlling a workflow support system sitting in alocal network. It is very difficult to utilize the information from the other networks or the other systems. Accordingly, companies and business establishments that employ different electronic mails and different workflow support systems cannot successfully accomplish such a workflow as to be transferred between companies and business establishments. Further, in case a similar workflow support system is used, the conventional system requires to always maintain the consistency between both systems by duplicating a control information base having an identical content to the data base of local networks on the paths where tasks of the workflow are transferred.

Naturally, it is possible to substitute the transmission of information among workflows flowing out from a local network by a usual electronic mail. However, there is a problem that the transmission is interrupted as to the distribution history of an electronic mail after having been sent out and the control information on the progress state of a workflow.

SUMMARY OF THE INVENTION

The present invention has been made in view of the foregoing problems, and an object of the present invention is to provide a workflow support system and a method of the same that make it possible to refer to and trace back the control information on the history and progress state of such workflows that are transferred to different electronic mails and different workflow support systems, and of atypical works as well as the foregoing typical work.

Here, an atypical work represents a work such that the document form and the path of flow are not fixed and cannot be supposed in advance. For example, as in a case of a report jointly written by plural members, a work such that the members share their own tasks, interchange drafts written by the members each other through a shared storage area on the network, and complete the report.

The present invention provides a system for supporting a workflow operation including a plurality of task operated by using a distributed system network having a plurality of local system, at least one of the local system including:

means for storing a task management information having a task information and a process information;

the task information including an information corresponding to each of the task operated by the one of the local system;

the process information including an information of the relation to another task and a task pointer to the task management information of the related task; and means for transferring the task management information between the one of the local system and another local system.

Further, the present invention provides a system for supporting a workflow operation recited in a first aspect, the one of the local system, further including:

means for storing open-documents opened in the network; and means for converting the task management information stored in the task management information storing means to a task sheet including a pointer to the task sheet of related task as the task pointer and storing the task sheet in the open-document storing means, wherein the transferring means transfers the task sheet.

Furthermore, the present invention provides a workflow support method for supporting a workflow employing a distributed system connected by a network, the method comprising the steps of:

holding, as a task control information of tasks generated in the workflow, at least a task information being an information unique to a task, and a process information formed of a task pointer information being a pointer for the task control information of the tasks that represents a relation between the tasks and has the relation;

converting, when a task is an execution task in an external system, the task control information of said tasks into a task sheet to be opened to the network;

transferring the task sheet to said external system to be executed;

converting, when receiving a task sheet from the external system, the task sheet into the task control information;

executing a task in accordance with the converted task control information;

and enabling the other task sheets to be referred to sequentially on the basis of a task pointer information contained in the task sheet.

BRIEF DESCRIPTION OF THE DRAWINGS

FIGS. 3A–3C are a chart for explaining an example of the task control information in the embodiment of the workflow support system relating to the invention;

FIG. 4 is a chart for explaining an example of the task sheet model in the embodiment of the workflow support system relating to the invention;

FIG. 6 is a chart for explaining a display example of a task sheet;

FIG. 9 is a chart for explaining a concrete example of a task table, of the task control information in the system of X corp.;

FIG. 11 is a chart for explaining a concrete example of a task table, of the task control information in the system of corp.

DESCRIPTION OF THE PREFERRED EMBODIMENT

Preferred embodiments of the present invention will hereafter be described in detail with reference to the accompanying drawings.

Figure 1:
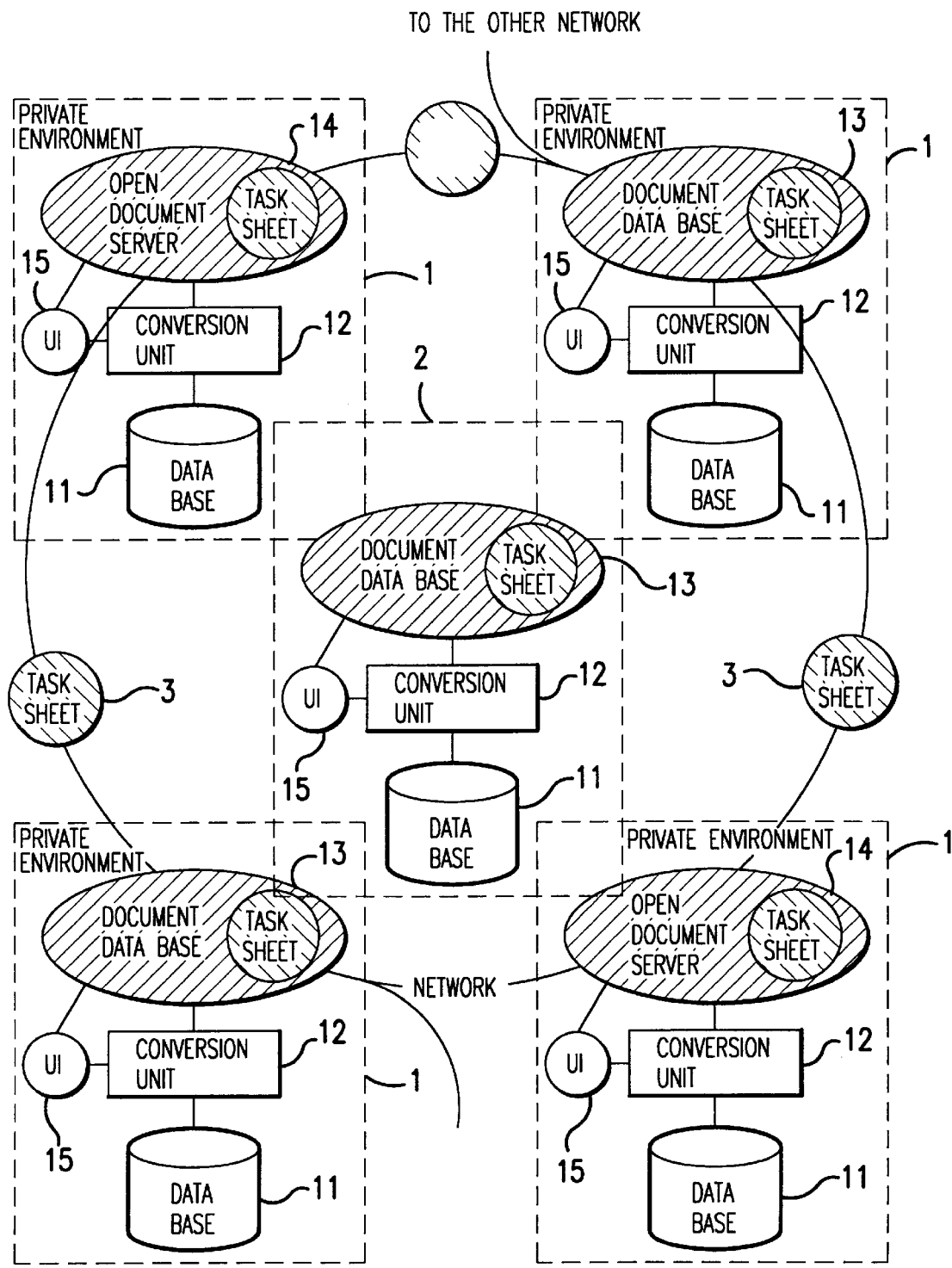
FIG. 1 is a chart showing a construction of one embodiment of the workflow support system relating to the present invention.

FIG. 1 illustrates a construction of one embodiment of a workflow support system according to the present invention. In FIG. 1, 1 represents a private environment, 2 shared environment for a group, 3 task sheet, 11 data base, 12 conversion unit, 13 document data base, 14 open document server, 15 user interface. FIG. 1 illustrates each component in a conceptual form. The network may be an local area network including an intranet and the like, a wide area network, or the Internet being the network of networks. The network physically connects a plurality of information processing equipments such as terminal equipment and the like. Each of users operates each terminal equipment. The private environment 1 is provided to each user, which is not needed to be provided individually to each terminal equipment. For example, the data base 11 may sit in a memory attached to terminal equipment used by a user, or it may sit in a memory attached to another terminal equipment, whereby the user actually accesses the data base through the network.

In the private environment 1 lies the data base 11 for a user to perform works in the environment, that controls local workflows. Logically, this data base is to be controlled by each person, which is not opened to the network. The data base 11 contains the control information of tasks as described later.

In the shared environment 2 for a group lies the data base 11 for a group of a plurality of users. This group is determined from an operational convenience, and the system does not impose any restriction on how the group is to be determined. The content of the shared data base 11 is basically the same as that of the data base 11 of the private environment 1. Logically, this shared data base 11 is controlled to be shared by the group members. Further, this type of shared environment 2 for a group may be provided more than two, and the users may belong to a plurality of groups.

Further, the reason to divide the contents of storage into the data base 11 of the private environment 1 and the data base 11 of the shared environment 2 for a group comes only from that it is preferable to store private information which only particular users use separately from the information which a plurality of users in a group desire to share. And, the storage may be divided from the operational convenience, and the system does not impose any restriction on how to use the data base 11.

The conversion unit 12 is provided in correspondence with each data base 11. In accordance with an instruction inputted from a user through the user interface 15, the conversion unit 12 converts a control information of a task in the data base 11 into a task sheet 3, which is stored in the document data base 13 or in the open document server 14. Further, the conversion unit 12 opens the task sheet 3 to the network, and converts the task sheet 3 in the document data base 13 and the open document server 14 into a control information of a task, which is stored in the data base 11.

The document data base 13 and the open document server 14 hold the task sheet 3 as well as electronic documents, etc.

The task sheet 3 and electronic documents held are freely accessible through the network. For example, giving a retrieval key to the document data base 13 will retrieve the electronic document or the task sheet 3 to meet the retrieval key. Further, giving to the document server 14 a document name being in a unique correspondence with the electronic document or the task sheet 3 held therein will retrieve the electronic document or the task sheet. Thus, the task sheet 3 is transferred between the private environments 1 and between the private environment 1 and the shared environment 2 for a group through the network. Further, the task sheet 3 can be transferred between the other network and the concerned network or between the other system and the concerned system.

The task sheet 3 is an information into which the conversion unit 12 converts the task control information for each task, which is, here, one of the electronic documents. The task control information is opened and transferred to the other systems in the format of the task sheet 3. The task sheet 3 is a document such that the request of a work and the report are integrated, which can be used as a space in which documents and messages relating to the task are interchanged and controlled. When the task sheet 3 is expressed, for example, by the markup language or the like, it is displayed by means of a browser to function as a user interface.

Figure 2:
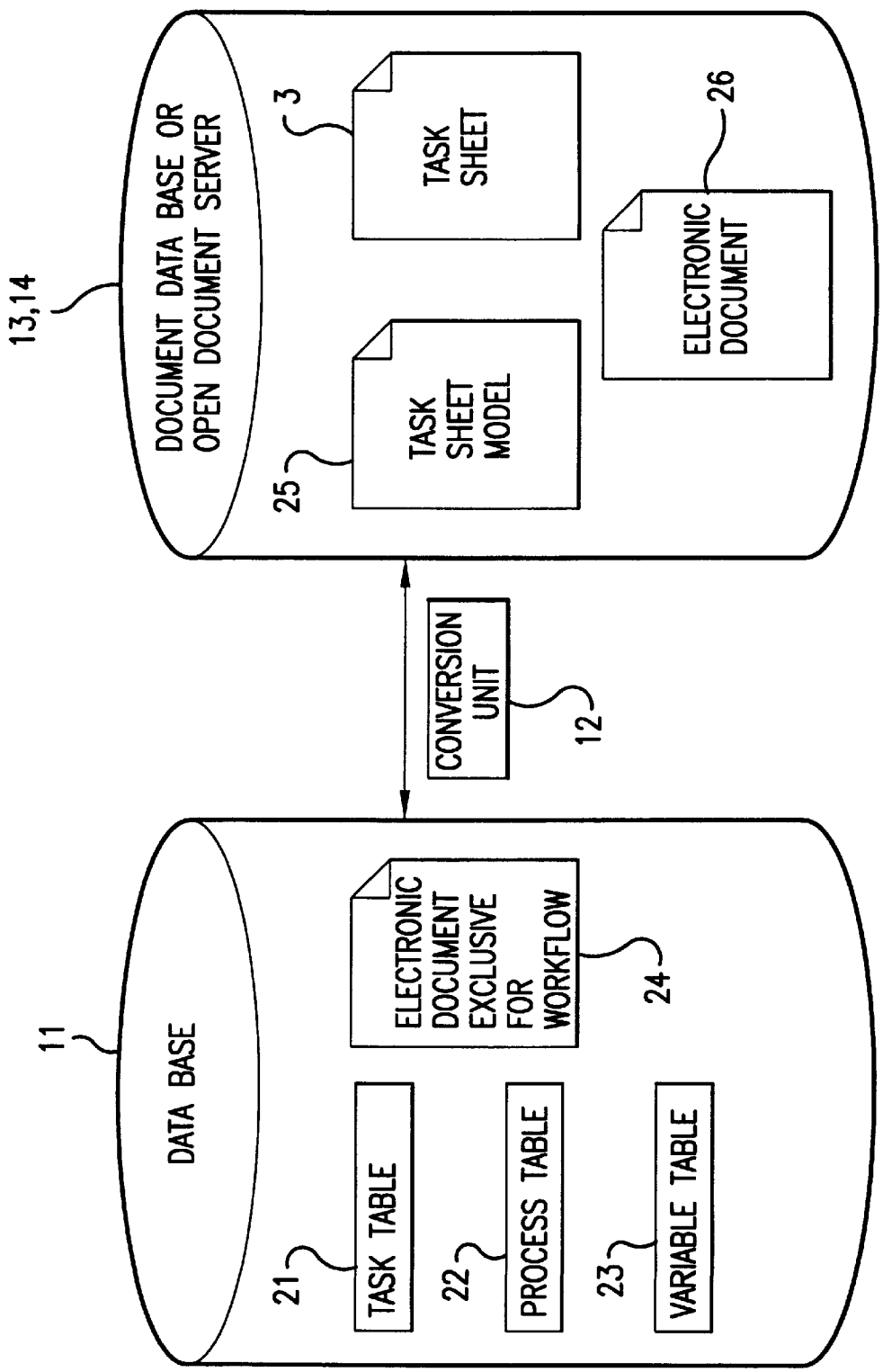
FIG. 2 is a chart showing an example of the environment in the embodiment of the workflow support system relating to the invention.

FIG. 2 illustrates a construction of the environments in the embodiment of the workflow support system according to the invention. FIG. 3 illustrates one example of the task control information. In FIG. 3, 21 shows a task table, 22 process table, 23 variable table, 24 electronic document exclusive for workflows, 25 model for a task sheet, 26 electronic document.

The data base 11 to control workflows stores, as the task control information, the task table 21, process table 22, and variable table 23. And, it also stores the electronic document 24 exclusive for workflows, etc.

As described above, a workflow is a sequence of tasks being a unit of work. A task control information includes an information such as inputs and outputs for controlling tasks and the present state, and a control information of the process in which the relation between tasks is expressed. In the one example of the task control information shown in FIG. 3, atask control information is comprised of the process table 22 shown in FIG. 3A, the variable table 23 shown in FIG. 3B, and the task table 21 shown in FIG. 3C. This is just one example, and it may be combined into one or two tables, or it may be embodied by dividing into still more plural tables.

The process table 22 represents the relation between tasks; as shown in FIG. 3A, for example, an ID of a task and an ID of a parent task that generated the task are paired to be registered. Here, the task-ID (parent task ID) is a unique ID on the network. If this task-ID contains both an address being an ID that uniquely specifies the database 11, document database 13, and open document server 14 distributed on the network, and an ID that is unique in the data base 11, document data base 13, and open document server 14, an ID that is unique in a wide area will be realized. For example, URL used in the Internet may be applied.

The task table 21 shown in FIG. 3C stores various information for controlling tasks. In this example, 'task-ID', 'task-name', 'executor/person-in-charge', 'requester/whom-to-report', 'input/reference-document', 'output-document', 'remark/session', 'state', 'start/completion/deadline', etc. are stored. 'task-ID' is a unique ID on the network as mentioned above, and specifies a task. 'task-name' is a name given to the task. 'person-in-charge' is a person who is responsible for promoting and accomplishing this task, in which the post, the managerial position, and the name are stored. 'requester/whom-to-report' is for the requester of a task and the person to whom the report is presented after executing the task, in which the post, the managerial position, and the name are stored. 'input/reference-document' is where information such as input documents for this task and a pointer for reference documents that are referred to on executing the task are stored. 'output-document' is where the person to whom the report is presented after executing the task and the pointer for a document whereby the task is to be handed over to the next are stored. 'remark/session' is where a pointer for indicating remarks from task executors or other persons involved is stored. State is where states such as waiting for execution, executing, and complete are stored. 'start/completion/deadline' is where the date when the task is started, the date when the task is completed, and the deadline in case of waiting for execution or executing are stored.

In this task table 21, 'document-ID' indicating the storage location of electronic documents and electronic document parts may be stored directly in the columns of 'input/reference-document', 'output-document', and 'remark/session'. Here, the document-ID is also a unique ID on the network, the same as the task-ID. If this document-ID contains both an address being an ID that uniquely specifies the database 11, document database 13, and open document server 14 that are distributed on the network, and an ID that is unique in the data base 11, document data base 13, and open document server 14, an ID that is unique in a wide area will be realized. For example, URL used in the Internet may be applied.

In stead of this document-ID, for example, a variable name can be stored. The correspondence between the variable name and the document is made by the variable table 23 shown in FIG. 3B. Thereby, inputs and outputs of tasks on the task table 21 can universally be represented.

The variable table 23 shown in Fig.3 is comprised of a task-ID, variable name, and area-ID. The pair of the task-ID and the variable name is formed to correspond with one area-ID. This variable table 23 enables to correspond a variable with an actual area. Electronic documents can always be taken in and out from such an area. When an area is ensured, for example, in the data base 11, a plurality of records having an identical area-ID are generated, and the ID to indicate the records is made the area-ID. In case of the document data base 13, or open document server 14, a folder and directory capable of storing and controlling a plurality of electronic documents, or an electronic document list and catalog are generated, and the ID to indicate these is made the area-ID. This enables an area indicated by an area-ID to store a plurality of items, a plurality of task sheet/pointer information, a plurality of electronic documents/pointer information, a plurality of electronic documents. By using the variable table 23, bringing the variable name into correspondence with the area-ID enables to indicate a plurality of electronic documents by one variable name.

Essentially, the foregoing task-ID and document-ID have to be brought into correspondence with the task sheet/pointer information indicating the storage location of the task sheet 3, and the electronic document/pointer information indicating the storage location of the electronic documents and electronic document parts, so that the task sheet 3 and electronic documents and electronic document parts can be accessed. In order to achieve this, the task sheet/ pointer information and the electronic document/pointer information have to include such a retrieval key that enables to find out any one of the data base 11, document data base 13, or open document server 14 on the network in which the real object sits in, and to take out the corresponding real object at any time from the data base 11 or the document data base 13; or these information have to include a complete file name specifying the corresponding real object on the file system of the open document server 14. Further, in order to enable a real object to be taken out from a remote place at any time, these information include an information specifying a file transfer protocol that the system can use in transferring a file.

In this example, the task sheet/pointer information indicating the storage location and the task-ID are made to be identical, and the electronic document/pointer information indicating the storage location and the document-ID are made identical to seek the simplest. However, as described above, essentially it is only required to define the correspondence between the task-ID and the task sheet/pointer information, or between the document-ID and the electronic document/pointer information. Therefore, the pointer information does not necessarily have to be identical to the task-ID (or document-ID) If not identical, providing a function table or a variable table capable of calculating these mutually can realize these in the same manner.

Further, the distinction between the electronic document and the electronic document part is needed in the display means, however in this example shown here, the distinction is not needed, and therefore, the foregoing two are called simply as the electronic document here.

To go back to FIG. 2, the document data base 13 or the open document server 14 contains the electronic document 26, task sheet 3, and task sheet model 25 for forming the task sheet 3. As described above, the conversion unit 12 converts the control information, such as the task table 21, process table 22, and variable table 23, of tasks in the data base 11 into the task sheet 3 to open it to the network. Here, the information of the task table 21, process table 22, and variable table 23 may be opened as the task sheet 3 as they are; however in this example, the control information is converted into the task sheet 3 on the basis of the task sheet model 25.

FIG. 4 is illustrates an example for explaining the task sheet model. The task sheet 25 shown in FIG. 4 is a document described according to HTML being one of the markup language. Naturally, it is not confined to HTML, or it may even be described according to another language other than the markup language, or it may be represented by the table format in FIG. 3, as described above.

A part of a character string put between special tokens % in this task sheet 25 can be replaced by, for example, the information of the task table 21, process table 22, and variable table 23, which can generate the task sheet 3. In this example, "%task-ID%" is replaced by a task-ID obtained from any one of the tables; and "%start-data%", "%deadline%", "%end-date%", "%state%", "%executor/person-in-charge%", "%requester/whom-to-report%" are replaced by information corresponding to each of these, obtained from the task table 21. "%input/reference-document%", "%output-document%", "%remark/session%" are replaced by the electronic document/pointer information obtained from the task table 21; or by the information obtained in such a manner that the variable name and the task-ID are acquired, the area-ID is acquired by using the variable table 23, and further the pointer for electronic documents in the area indicated by the area-ID is acquired. Further, "%input/reference-document-name%", "%output-document-name%", "%remark/session-title %" are replaced by the document names of electronic documents that the pointer indicates.

As to "%parent-task-ID%" and "%parent-task-ID-name%", the concerned task-ID retrieves information sitting in the column of the task-ID on the process table 22 and acquires the task-ID listed on the column of the corresponding parent task-ID as a parent task-ID; and acquires a task name from the entry of the task table 21 having the parent task-ID as aparent task-ID name; and the parent task-ID and the parent task-ID name thus acquired replace "%parent-task-ID%" and "%parent-task-ID-name%". In the same manner, as to "%child-task-ID%" and "%child-task-ID-name%", the concerned task-ID retrieves information sitting in the column of the parent task-ID on the process table 22 and acquires the task-ID listed on the column of the corresponding task-ID as a child-task-ID; and acquires a task name from the entry of the task table 21 having the child task-ID as a child-task-ID name ; and the child-task-ID and the child-task-ID name thus acquired replaces "%child-task-ID%" and "%child-task-ID-name%".

Figure 5:
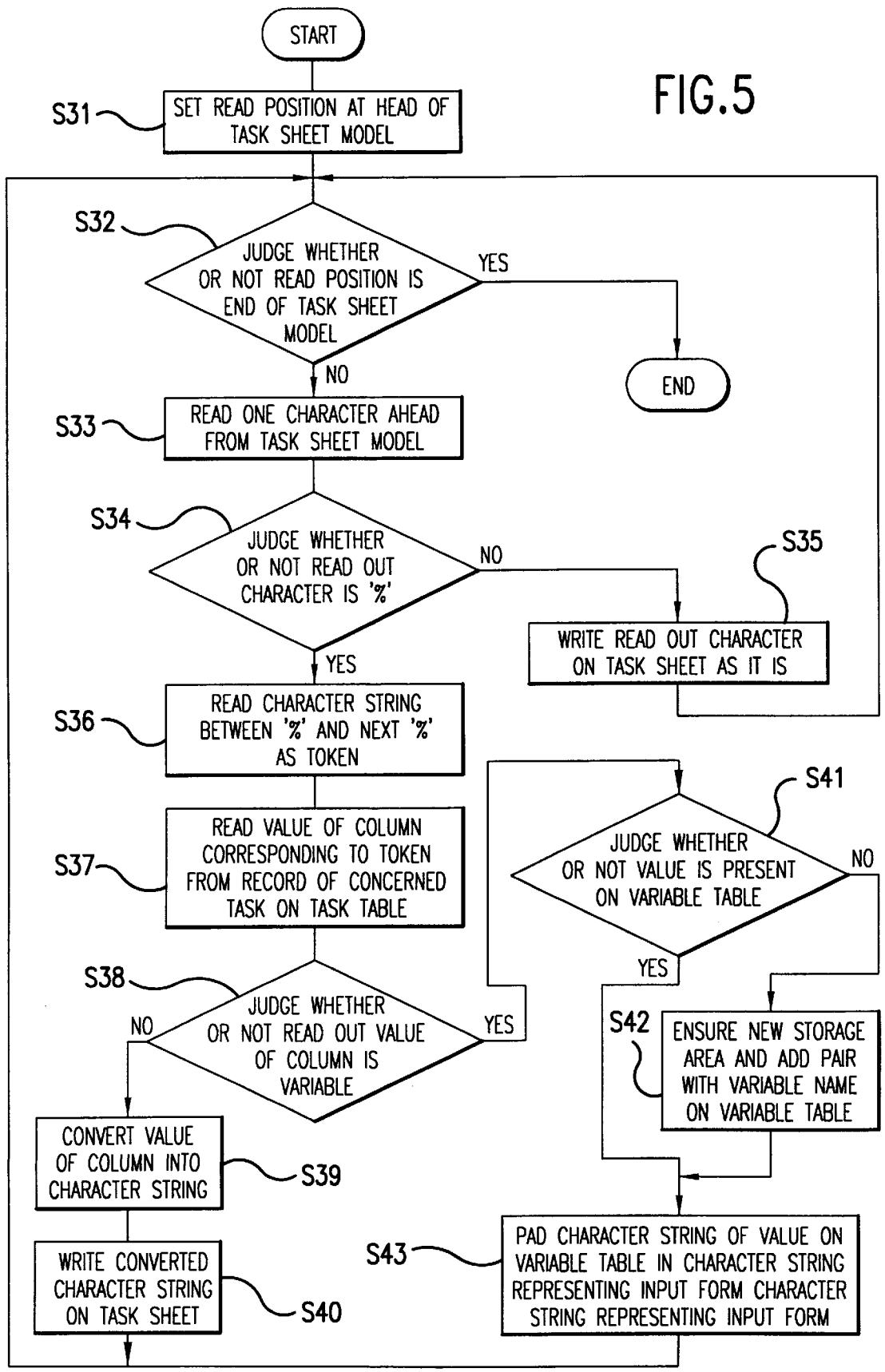
FIG. 5 is a flow chart showing an example of the process for generating the task sheet by the conversion unit.

FIG. 5 is a flow chart showing one example of a task sheet generation process by the conversion unit. The process for replacing the foregoing items can be carried out by the process shown in FIG. 5. First as the initialization, at S31, a read position is set at the head of the task sheet model 25. Next, S32 judges whether or not the read position is the end of the task sheet model 25; if the read position is the end, S32 judges that the generation of the task sheet finished, and ends the processing.

If the read position is not the end, S33 reads one character ahead. S34 judges whether or not the read out character is '%', and if not '%', S35 writes the read out character on the task sheet 3 as it is, and returns the processing to S32.

If the read out character is '%', S36 reads a character string between the '%' and the next '%' as a token. And, S37 reads a value of a column corresponding to the token from a record of the concerned task on the task table 21 and the process table 22 of the data base 11. S38 judges whether or not the read out value of the column is a variable. If the read out value is not a variable, S39 converts the value of the column into a character string, and S40 writes the converted character string on the task sheet 3, and returns the processing to S32.

If the read out value of the column is a variable, S41 judges whether or not the value is present on the variable table 23. If not present, S42 ensures an area where the input value can be taken in and out at any time, in the data base 11, the document data base 13, or the open document server 14. The ID indicating this ensured area is handled as an area-ID. A set of this area-ID, task-ID, and variable name is added on the variable table 23.

At S43, for example, the following character string showing an input form in the markup language is applied.

<input name=[variable name]"value="[default value of the value]>

Here, a certain variable name being the read out value of the column is padded in the "[variable name]". This converts variables contained in the task control information into the description of the input form by the markup language. The input form is not only a part for displaying a content, but also a part for allowing a content to be inputted. In addition to writing a text, the input form can be used as a frame for dragging and dropping icons of electronic documents. This operation transfers and the electronic document to an area indicated by the area-ID that the correspondence is made to the variable name, and stores therein.

And, the following character string is added on the converted task sheet.

<![variable name]=[area-ID]>

Or, as the area-ID, a value that the task-ID of the task and the task sheet 3 is combined with a variable name can be used. In that case, this character string is regarded as being already added, and the addition is not needed.

Or, a reference to an area indicated by the character string of a value on the variable table 23 corresponding to a read out variable name may be arranged to acquire a document-ID or document name that specifies one or more documents in the area and to write the document-ID or document name on the task sheet 3. In this case, the input of the content becomes unnecessary.

When the processing of one token finishes, the process returns to S32, and further ahead reads the task sheet model 25. When reading ahead in this manner to the last of the task sheet model 25, the conversion into the task sheet 3 ends.

The task sheet 3 thus converted and generated has a configuration such that the task-ID of the task sheet 3 can take out the task sheet 3 at any time, and is stored in the document data base 13 or the open document data server 14. However, this storage does not necessarily have to be performed, and the task sheet may be thrown away. Further, the opportunity of conversion may be a time when a task is generated, a time when a request for referring to a task is generated, or a time when a manager instructs a conversion through the user interface.

FIG. 6 is a chart for explaining an example of a representation of a task sheet. Converting information of the task table 21, process table 22, and variable table 23 by using the task sheet model 25 as mentioned above will produce the task sheet 3. If the task sheet model 25 is a document that is described according to HTML as shown in FIG. 4, a generated task sheet 3 will have a presentation as shown in FIG. 6 by using, for example, the browser.

The electronic document 26 relating to a certain task is stored in the document data base 13 or the open document server 14 as well as the task sheet 3. Document-IDs served as a retrieval key for taking out the electronic document 26 are stored in columns of the "input/reference-document-list", "output-document-list", and "remark/session" of the record on the task table 21. Or, the variable names are stored in these columns, an area-ID is obtained from the variable table 23, and the document-ID of the electronic document in the area indicated by the area-ID can be obtained. The document-ID is padded in the task sheet 3 by the conversion processing of the conversion unit 12 as shown in the aforesaid FIG. 5. In this case, the document-ID is identical to the electronic document/pointer information indicating the storage location of the electronic document 26; and therefore, the electronic document/pointer information that indicates the storage location of the general electronic document referred to or created in this task is added on the task sheet 3.

In the representation as shown in FIG. 6, document names and titles displayed in the items of the input/reference document, output/report document, and remark/session are each linked with the corresponding documents by the electronic document/pointer information added on the task sheet 3. Therefore, indicating a document name on the column of the input/reference document, for example, can refer to the document. In the example shown in FIG. 6, the title selects "We would like you to handle this matter as you think fit (A Ichiro from X corp.)", and the content is displayed under this column.

Further, the conversion processing by the conversion unit 12 as shown in FIG. 5 retrieves a record having the task-ID of a task executing a conversion processing into the task sheet 3 from the process table 22, which pads aparent task-ID and child-task-ID. As described above, since the task-ID is identical to the task sheet/pointer information indicating the task sheet storage location, the task sheet/pointer information indicating the task sheet storage location for the upper task that gave the opportunity of generating the task and the lower task sheet/pointer information indicating the task sheet storage location of the child task generated by the execution of the task are added on the task sheet 3 of the task. Thereby, in the representation as shown in FIG. 6, the task names displayed in the terms of the upper task and the lower task are each linked with the corresponding task sheets.

In the representation of the upper task and the lower task as shown in FIG. 6, tasks displayed are each linked with the respective task sheets by the task-ID. Thereby, the task displayed can be instructed. This instruction can read out the task sheet of a task instructed. By this instruction, the task sheet of a task instructed is to be displayed in the same format as, for example, FIG. 6. For example, if "specification-making" in the upper task is selected, the task sheet of the "specification-making" task is displayed, and the "specification-making-allocation-to-Y corp." task shown in FIG. 6 as the lower task and the tasks relating to the other specifications are displayed. And, if the upper task is present, the task is also displayed. In the same manner, if the lower task, "proposal-to-Y corp.-allocation" is selected, the task sheet of the "proposal-to-Y corp.-allocation" task is displayed, "specification-making-allocation-to-Y corp." task and the other tasks are displayed, and in the lower task, a task generated from this task is displayed.

Thus, since there is a linkage of the task with the task sheet in the upper and lower task, it is possible to refer to or trace back the progress state of the tasks in the workflow. Here, the task-ID and the document-ID and the like are set uniquely on the network; and therefore, it is possible to control the state if the workflow crosses the other workflow, or to trace back the workflow.

The concept of the upper/lower task described here is applied to a case in which an original workflow system is hierarchically modeled; in contrast to this, to a workflow system modeled on the assumption that the work flows in one direction only, this concept can be applied by replacing these with the upstream/downstream task.

In the foregoing example, only the document-ID is padded in the task sheet 3, however, a duplicate of the electronic document indicated by the document-ID may be made to be linked with the task sheet 3. Namely, when the document-ID is padded in the task sheet 3 by the conversion processing in the conversion unit 12 as shown in the foregoing FIG. 5, the duplicate of the electronic document 26 retrieved by the document-ID is taken out, <compound document starting symbol> and the document-ID are inserted in the end of the task sheet 3, and next the duplicate of the electronic document is linked, and <compound document ending symbol> is added. When there are a plurality of electronic documents, the processes after <compound document starting symbol> are repeated. Thereby, a compound task sheet can be generated as a compound document including duplicates of electronic documents. Further, the duplicate of an electronic document does not necessarily have to be an electronic document proper, for example, it may be one converted so as to be decoded, in order to meet the condition required by the system environment.

The conversion unit 12 converts the information of the task table 21, process table 22, and variable table 23 as mentioned above, and in addition, it can perform the reverse conversion. The conversion into a task control information format of the workflow from the task sheet 3 is done such that a given task sheet 3 is compared with the task sheet model 25 as shown in FIG. 4, and a part corresponding to a special token (a character string put between a "%" and the subsequent "%", in this case) is extracted. To specify a part to be extracted as a special token may be embodied by detecting a specific mark of the markup language. It can be done such that the extracted special token is rearranged in the order as a record of the task table 21 and linked, and is added on the task table 21 of the data base 11 as one record.

Further, if the part corresponding to the extracted special token is a character string indicating the input form, the part is extracted by the character string served as the variable. For example, <input name="[variable name]" value="[default value of value]"> takes the [variable name] as its value. This realizes that a description of the input form described according to the markup language is converted into a variable as the task control information of the workflow. And, at the same time, <![variable name]=[area-ID]> is read, which is stored in the variable table 23 of the task control information of the workflow as a record including the task-ID, variable name, and area-ID; and thereby, a pointer for an area in which the information inputted by the input form is stored can be stored as a value of a variable. When the original workflow system is not able to handle a variable, and does not possess the equivalent of the variable table, instead of extracting a character string indicating the input form as the variable name, by extracting an area-ID corresponding to the variable, the area-ID may be designed to be stored in the task control information as the value.

Further, a part of the upper task-ID is linked as one record in the order of "task-ID-of-concerned-task-sheet-itself, upper-task-ID" in each upper task-ID, and is added on the process table 22 of the data base 11. A part of the lower task-ID is linked as one record in the order of "lower-task-ID, task-ID-of-concerned-task-sheet-itself" in each lower task-ID, and is added on the process table 22 of the data base 11. This realizes that the task sheet/pointer information indicating the storage location of the upper and lower task sheet is converted into a task control information format indicating the relation between tasks of the workflow.

And, issuing an instruction to the data base 11 changes the state column of a record of the concerned task into 'waiting for execution', or if there is another tasktable waiting for execution, moving this record on the task table makes the workflow system recognize the generation of a task based on the task control information being a result converted from the task sheet; thus automatically starting the task.

If the task sheet 3 is a compound task sheet including the contents of electronic documents, the compound task sheet is read from the head, the part from the head to the location to encounter the first <compound document starting symbol> is separated as a task sheet. The part from there, skipping document-IDs, to the location to encounter the <compound document ending symbol> is separated as one electronic document. This processing is repeated. Thereby, the compound task sheet is divided into a task sheet division corresponding to the task sheet and an electronic document division other than the task sheet division. Further, if the electronic document division is converted in order to meet the condition required by the system environment, the electronic document division is decoded by executing the reverse conversion.

To the separated electronic documents each are applied new document-IDs. Here, the correspondence between the original document-ID skipped and the newly applied document name is recorded in a work area or the data base 11. And, while relating these electronic documents so as to take out any time by retrieving the applied document-ID, these electronic documents are stored in the document data base 13 or in an area on a file system of the open document server 14 such that this document-ID could become a complete file name.

The task sheet division first separated is to be added in the task table 21 and the process table 22, etc. of the data base 11, as described above. As a column value of a record of the concerned task on the task table 21, old document-IDs listed on this compound task sheet remain as used. According to the correspondence chart between the original document-ID and the new document-ID that is already recorded in the work area or the data base 11, all these old document-IDs are replaced with new document-IDs. This enables the pointer of the electronic document already stored to be added on the task control information of the workflow.

Figure 7:
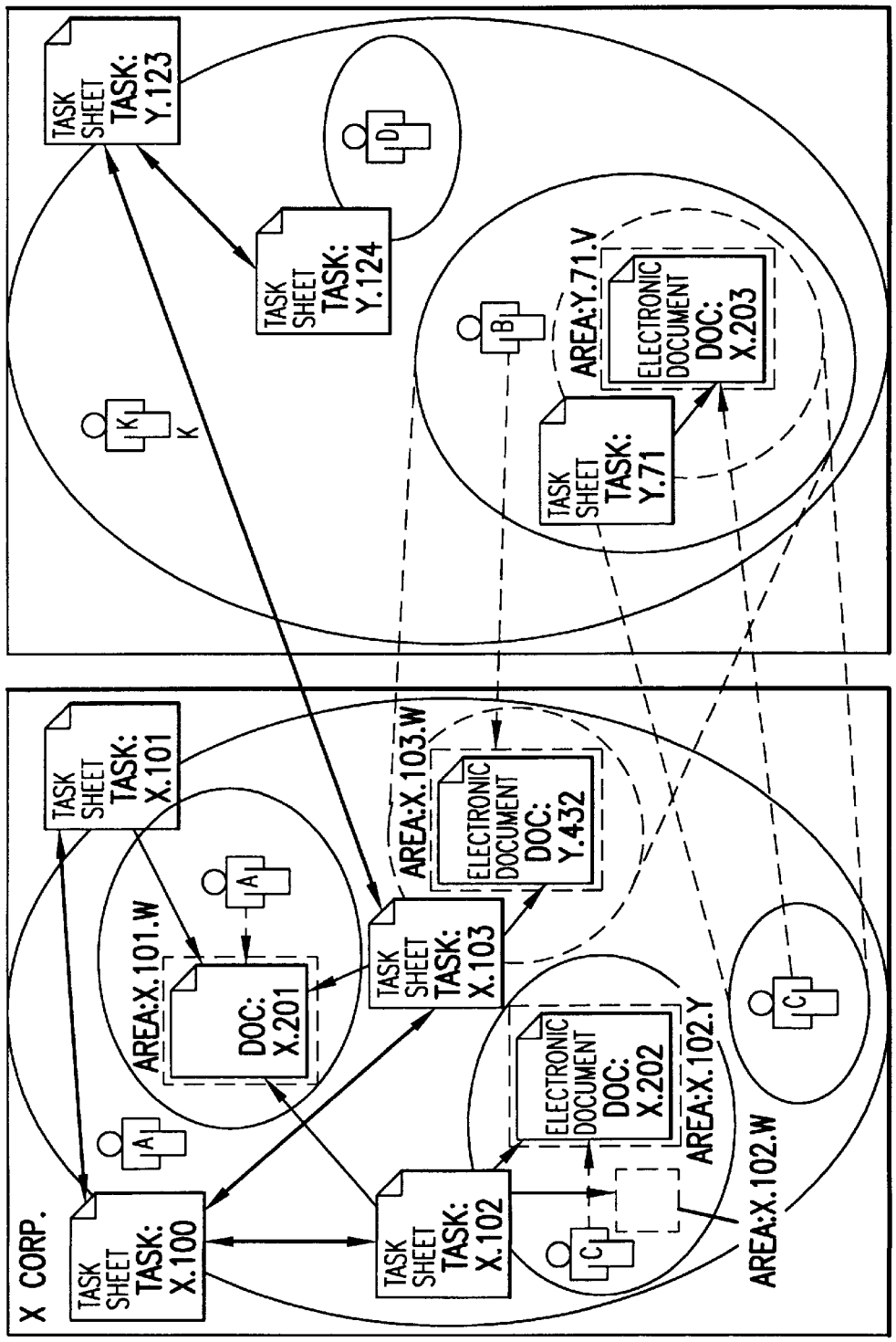
FIG. 7 is a chart for explaining a concrete example of a work process.

The operation of the present invention will now be described using a concrete example. FIG. 7 is a chart for explaining a concrete example of a work process. FIG. 8 and FIG. 9 are charts for explaining concrete examples of the task control information in X corp. FIG. 10 and FIG. 11 are charts for explaining concrete examples of the task control information in Y corp. Here, in FIG. 8 through FIG. 11, columns and records are omitted, which are not needed in the following explanation. Further, in FIG. 7, thick segments with arrows on both ends represent upper/lower task pointers, thin arrows represent document pointers, dotted lines with arrows represent writings of electronic documents.

Suppose that X corp. and Y corp. are tied up technologically to cooperatively develop a certain product. And, consider a workflow that Mr. A from X corp. becomes the coordinator to promote writing the draft of the specification by both companies in cooperation. FIG. 7 is a visual representation to easily understand this concrete example.

Mr. A starts this task by the system in X corp. To the task ID of the task started, the number 100 in X corp. is assumed to be allocated. Hereinafter, this task is notated as TASK: X. 100. Here, this TASK: X. 100 is assumed to be generated from TASK: X. 96, which is not illustrated in FIG. 7.

This task TASK: X. 100 is assumed to start a task TASK: X. 101 for writing a document with which Mr. A explains the policy to the other members involved and gives instructions to them, a partial task TASK: X. 102 and TASK: X. 103 that both the companies take on.

Here, the starting means of the task may essentially be manual or automatic. However, in the workflow system disclosed in the foregoing Japanese Published Unexamined Patent Application No. Hei 8-101817, a mechanism is provided which maintains the relation between the works, as a flow of a series of works even when starting related tasks manually sequentially, and controls the workflow. However, generally the so-called workflow system must have a rule for the workflow in advance. Accordingly, the case described here has the rule in advance. The notation of the rule varies depending on the system. Here, a notation is taken up as an example which follows the Prolog language based on first order predicate logic being the notation in the foregoing Japanese Published Unexamined Patent Application No. Hei 8-101817, which is most simplified as long as it is allowed in the explanation here.

FIG. 12 is a chart for explaining one example of a rule for the workflow. In order to start, for example, a series of workflows from the foregoing TASK: X. 100 through TASK: X. 103, it is only needed that a rule as shown in FIG. 12, for example, is defined. In the example shown in FIG. 12, the first argument represents the executor, the second argument represents whom to report, the third through the fifth arguments each indicate the electronic document or storage area of the input, output, and session. And, '?' represents that the following symbol is a variable. This rule expresses a relation that the identical variable names have to have an identical value as to the variables in this rule, which is important, and the variable name itself may be deleted after the rule is applied. '←' represents implication (if −). In other words, "a←b, c" represents that a holds if b and c are met. If the proof process based on this backward resolution is interpreted from a procedure, in order to accomplish (prove) a, both b and c have to be accomplished. Therefore, if task a is started (generated as having to be accomplished), tasks b, c are to be started.

First, using the user interface 15 for starting tasks of the workflow system, or sending out "specification-making(X. A, X. T, ?input/reference-document-list, ?output-document-list, ?remark/session)" to the system in which the task sheet 3 being the electronic document is described can start TASK: X. 100. Here, X. A represents Mr. A from X corp., X. T represents Mr. T from X corp. And, the system automatically gives the task-ID of the task started to avoid overlap.

Starting the task TASK: X. 100, the system applies the rule as shown in FIG. 12, and sequentially starts the tasks of 'instruction-policy-for-making', 'specification-making-allocation-to-X corp.', 'specification-making-allocation-to-Y corp.', with the task-IDs of TASK: X. 100 through TASK: X. 103 applied. With starting these tasks, the system adds information on the task table 21. Further, the system stores the parenthood between the applied task IDs in the process table 22, and if it contains variables, the system ensures areas for the variables and stores the relation between the variable and the area-ID in the variable table 23.

Incidentally, many of the workflow systems are not provided with data bases that store tables for information as shown here. However, to start a new task while applying a rule of a workflow shows that generally a task exists on the upstream and the system applies the rule to the information. Therefore, even temporarily, the system possesses a similar information to the foregoing table when applying a rule. Therefore, generating the task sheet in the present invention at this timing by using this temporary information can prevent the problem that this control information base is not provided. Namely, the task sheet can hold the relations between the tasks and between the task and the document in replacement of the data base.

Figures 8A, 8B, 8C:
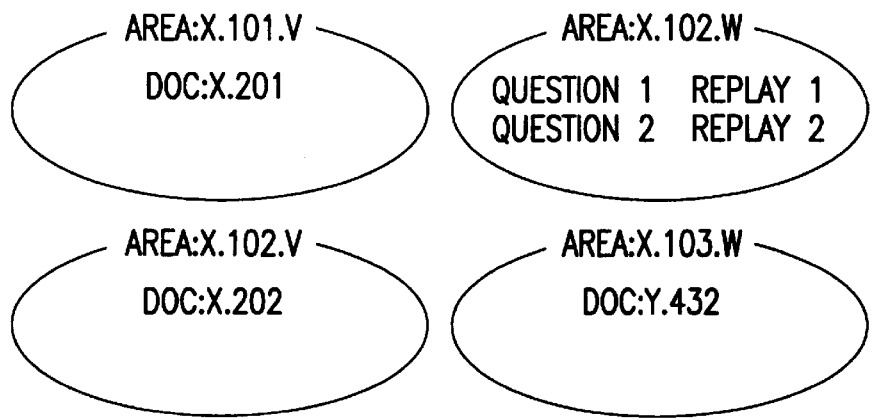
FIGS. 8A–8C are a chart for explaining concrete examples of a process table, variable table, and storage contents in areas, of the task control information in the system of X corp.

Starting the task as mentioned above will generate the task TASK: X. 101, TASK: X. 102, and TASK: X. 103 from the task TASK: X. 100. Accompanying with this, three task information generated in the task table, for example, the second through the fourth records shown in FIG. 9, are added in the task control information of the workflow system of X corp. Values to which the mark '?' is applied in the added records indicate variable names. The variable names sitting in these records are each provided with areas, and the records from the first through the sixth of the variable table shown in FIG. 8B are added. Here, in the area-ID, a unique ID is generated by (a part of) the task-ID and the variable name. And, when an identical variable name is used in the rule of the workflow, an identical area is allocated. In the example shown in FIG. 8B, the identical area AREA: X. 101. V is allocated to the variable ? X of the task TASK: X. 101, the variable ? U of the task TASK: X. 102, and the variable ? V of the task TASK x. 103.

Further, the task TASK: X. 101, TASK: X. 102, and TASK: X. 103 have the task TASK: X. 100 as the parent task, and records are generated to show this relation in the process table. For example, in the process table in FIG. 8A, the records from the second through the fourth are added.

The area AREA: X. 101. V is an area that is provided in correspondence with the variable ? V of the task TASK: X. 101, as mentioned above. Namely, this area is an area that is indicated by the area-ID named as "AREA: X. 101. V" from the input form of the task sheet of the task TASK:X. 101. Mr. A makes the electronic document DOC: X. 201, and superimposes an icon of the electronic document on the concerned input area on the display of the task sheet through operating the user interface 15; thereby storing the electronic document DOC: X. 201 in the area AREA: X. 101. V.

The task TASK: X. 103 is a task to be executed by Y corp., as it is seen from the column value of the person responsible for execution shown in FIG. 9. The task control information of this task TASK: X. 103 is converted into a task sheet and transmitted to Y corp. by an electronic mail. Naturally, it may be transmitted through a recording medium such as a floppy disk, other than the electronic mail, or through HTTP. To generalize these, the expression "transfer" will hereafter be employed. In this conversion, on the task sheet of the task TASK: X. 103 are padded an information that the upper task is the task TASK: X. 100, and information that the input document is stored in the area AREA: X. 101. V; and as to the variable of the output document, the area AREA: X. 103. W to store the value is ensured in the system of X corp., and this area-ID being the pointer for the area is padded thereon.

Receiving the task sheet, the system in Y corp. converts it into the task control information, and stores a task-ID such as the first record in FIG. 11 in the task table of the system in the Y corp. Further, the system stores an area-ID corresponding to the variable, for example, as the first and second records in FIG. 10B, and turns the value of the state column of this record into the state of 'waiting for execution'. Further, the system stores the record that the parent task is the task TASK: X. 100 as the first record of the process table in FIG. 10A, and starts the task TASK: X. 103.

As seen from the record that the executor/person in charge for this task TASK: X. 103 is "Y. B", Mr. B is in charge of this task in Y corp. Mr. B recognizes that the input document is stored in the area AREA: X. 101. V, and refers to the sight of the electronic documents in this area. Thereby, Mr. B is able to know that the input document is the electronic document DOC: X. 201 and to take out this to read the instruction. If the task sheet already transferred is a compound task sheet, when the task sheet is converted into the task control information, the electronic document DOC: X. 201 is stored in the document data base in Y corp., in such a form as to be retrievable at any time by using this document-ID as the retrieval key. If the task sheet is not a compound task sheet, the electronic document DOC: X. 201 is stored only in the document data base in X corp., however, specifying this document-ID will make the system in X corp. transfer the electronic document; thus guaranteeing that the document can be taken out at any time.

While finishing the work, Mr. B outputs the electronic document DOC: Y. 432 that he made in his private environment as the output document of this task. Just the same as Mr. A stores the electronic document DOC: X. 201 in the area AREA: X. 101. V, Mr. B drug and drop the icon of the electronic document DOC: Y. 432 on the display showing the concerned output area AREA: X. 103. W of the task sheet through operating the user interface 15. Thereby, the electronic document DOC: Y. 432 is transferred to the system in X corp., and stored in the area AREA: X. 103. W. Or, Mr. B may store the electronic document in the document data base in Y corp., and store the pointer in the area AREA: X. 103. W in X corp.

On the other hand, the task TASK: X. 102 is also started, and Mr. C who is in charge of this task writes the electronic document DOC: X. 202 using the electronic document DOC: X. 201 stored in the are AREA: X. 101. V as the input document, and stores the result in the area AREA: X. 102. V being the area for the output document. This task TASK: X. 102 is provided with the area AREA X. 102. W for the session.

Now, suppose that Mr. B desires to get information of a task other than his own task in the course of work. In this case, Mr. B recognizes that the upper task of his is the task TASK: X. 100 from the task control information of his, namely, the information contained in the task sheet of the task TASK: X. 103. Since this task-ID is served as the pointer as well, specifying this, Mr. B can take out the task sheet of the task TASK: X. 100 stored in X corp. at any time. While there can be a case that the task sheet of the task TASK: X. 100 is not present yet, in that case according to the request, Mr. B can convert and generate the task sheet from the task control information when requested.

Referring to the task sheet of the task TASK: X. 100, Mr. B knows that there is the task TASK: X. 102 of which Mr. C is in charge, other than the task TASK: X. 101 that Mr. A first wrote the policy and instruction on making the draft and the task TASK X. 103 of which Mr. B is in charge. And, transferring the task sheet of the task TASK: X. 102, Mr. B will realize that the area where the output document being the result of this task is stored is the area AREA: X. 102. V.

Suppose that when Mr. B transfers the electronic document DOC: X. 202 stored in the area AREA: X. 102. V and refers to it, Mr. B realizes that Mr. C is conducting in a slightly different manner from what Mr. B thought. Accordingly, Mr. B writes his comment on the area of the remark/session on the task sheet of the task TASK: X. 102. Since the task TASK: X. 102 has the correspondence with the area AREA: X. 102. W for the session, the comment that Mr. B wrote is stored in the area AREA: X. 102. W. Mr. C refers to the comment that Mr. B wrote in the area AREA: X. 102. W, and writes his comment and/or reply against Mr. B's comment in the area AREA: X. 102. W. Thus, the exchange of comments can be repeated through the common area AREA: X. 102. W. The comments and remarks and others written in the area AREA: X. 102. W may be stored as the electronic document parts in this example.

Figures 10A, 10B, 10C:
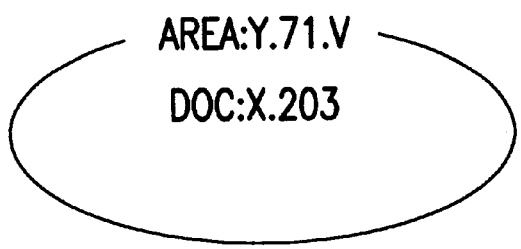
FIGS. 10A–10C are a chart for explaining concrete examples of a process table, variable table, and storage contents in areas, of the task control information in the system of Y corp.

While exchanging comments, suppose that Mr. B recognizes that Mr. C seems to have a unique proposal on a part of the task of which Mr. B is in charge. Accordingly, Mr. B decided to request Mr. C to make a proposal on the part as a task. Mr. B newly starts a lower task TASK: Y. 71 forming a part of the task TASK: X. 103. Thereby, the task control information of the task TASK: Y. 71 is added on the system in Y corp. Namely, the second record on the task table in FIG. 11 is added and the third record on the variable table shown in FIG. 10B is added, which ensures the area AREA Y. 71. V. Further, as the second record on the process table shown in FIG. 10A, a record that the parent task of the task TASK: Y. 71 is the task TASK: X. 103 is added.

The task control information of the lower task TASK: Y. 71 being a newly generated task is converted into a task sheet, then the task sheet is transferred in reverse to Mr. C of X corp., and the task sheet is converted into the task control information by the system in X corp. Thereby, the fifth record on the task table shown in FIG. 9 is added, the seventh record on the variable table shown in FIG. 8B is added, and the fifth record on the process table shown in FIG. 8A is added. And, Mr. C writes an electronic document DOC: X. 203, which he stores in the storage area AREA: Y. 71. V for the output document of the task TASK: Y. 71 sitting in the system in Y corp.

While some time has passed, suppose that a task TASK: Y. 123 for developing a new product in Y corp. is generated again. Suppose that Mr. K in charge of this task realizes that the result of the task TASK: X. 103 gives useful information as a part of the new product and can be utilized. Accordingly, Mr. K decided to take up the task TASK: X. 103 as one of the lower tasks as well as the lower task TASK: Y. 124 of the Y corporation's own, in the task TASK: Y. 123.

In this case, records of the new tasks: Y. 123 and TASK: Y. 124 are added, for example, as the third and fourth records on the task table shown in FIG. 11. As the records showing that the parent task is the task TASK: Y. 123 and the lower tasks are the task TASK: Y. 124 and the task TASK: X. 103, for example, the third and fourth records on the process table shown in FIG. 10 (A) are added. Thereby, on the task sheet of the task TASK: X. 103 are added the task TASK: Y. 123 as the upper task. However, since the task sheet of the task TASK: X. 103 is originally transferred from X corp., the task sheet is converted into a task sheet having this change reflected, which is transferred to X corp. The system in X corp. converts the task sheet into the task control information, which leads to adding a record that the parent task of the task TASK: X. 103 is the task TASK: Y. 123, as the sixth record on the process table in FIG. 8A.

Thereby, Mr. K being the executor of the task TASK: Y. 123, tracing the lower task TASK: X. 103, can refer to the task sheet of the still lower task TASK: Y. 71, the task sheets of the task TASK: X. 101 and the task TASK: X. 102 through the task TASK: X. 100, and the electronic documents that are the fruits of these tasks. For example, Mr. K knows that the task TASK: Y. 71 is proposed by X corp., and referring to the electronic document DOC: X. 203 being the fruits of this task, he can determine "what part is to be adopted to the new product unique to Y corp."

The concrete example has been described hereinabove, and in this concrete example, the task sheets, electronic documents, or electronic document parts exist in the side that requested the task. However, a method that provides the areas on the side receiving task sheets and stores the task sheets can be realized. For example, it can be achieved by storing an ID again indicating an area in the area as mentioned above. Further, the areas may be provided double on the both sides. Which method is to be adopted may be decided from the operational availability.

As clearly seen from the above description, the system according to the present invention holds at least, as the task control information, the task information that is an information intrinsic to the task, and the process information formed of the task pointer information that represents the relation between the tasks and functions as the pointer for the task control information of the tasks having the relation. Therefore, if the task from the self-system is executed by the other system, or if the task from the other system is executed by the self-system, the system makes it possible to access the task control information of the tasks owing to the task pointer information and control the workflow. Accordingly, as to the workflow crossing companies and business establishments that employ different electronic mails and different workflow support systems and the atypical work as well as the foregoing typical work, the history and progress state of the task can be referred to and traced back.

Further, the system can convert a control information of the task generated by the workflow into an electronic document called a task sheet, and the task sheets can be opened to a local area network including the Intranet, a wide area network, or the Internet being the network of networks; and thereby, it becomes possible to refer to the task sheet from the other information processing equipments on the network and from the other different network, and to get the task control information of the workflow.

The relation between the tasks can be designed as the upper-lower relation between a task and the upper task having the task as a part, or as the invention set forth in a fourth aspect, as the former-later relation of the sequence in executing the tasks in the workflow. Tracing such a relation, the persons involved will have the information on the state of the workflow, etc. Specially, representing such a relation between the tasks in the task sheet, and holding the task sheet pointer information indicating a task sheet of related tasks will link the related tasks. Therefore, by tracing this linkage, the external network can refer sequentially to the related task sheets and can get information on the history and progress state of the workflow, and the concerned network can refer sequentially to the task sheets existing in the external network.

Further on the contrary, converting the task sheet into the task control information of the workflow enables the task sheet information of the electronic document format to be inputted to the exclusive workflow system.

The task control information can be designed so as to include the electronic document pointer information indicating the storage area for the electronic documents and electronic document parts which are referred to or written in the task, or as the invention set forth in a seventh aspect, so as to include the electronic document pointer information indicating the electronic documents and the electronic document parts. Thereby, the storage location of the electronic documents and the electronic document parts relating to the task can be informed.

Further, the task control information may be configured such that the foregoing task information contains variables and the variables are set up in correspondence with the pointers indicating the areas capable of storing the electronic documents and the electronic document parts. In this case, a storage area for the concerned task can be allocated to the other task as well according to the rule of the workflow, and a plurality of tasks will be able to share the electronic documents and the electronic document parts. Further, in atask to integrate a plurality of drafts by the members, which becomes necessary when a plurality of the members are teamed to write, it becomes possible to store and control the files of these plural electronic documents and electronic document parts collectively.

When the electronic documents and the electronic document parts have a unique document-ID in the distributed system, the electronic document pointer information can use the document-ID as the pointer. Thereby, the document-ID to distinguish the electronic documents and the pointer indicating the storage location of the electronic documents can be represented by the document-ID only.

Forming the task sheet into the electronic document described according to the markup language enables the task sheet to be referred to through a general purpose viewer, the pointer information to be put into nondisplay in the viewer display, and the task sheet to be exchanged through a system that transfers only the text format. In case of this task sheet, as the invention set forth in a tenth aspect, it is possible to identify a unique task sheet ID in the distributed system as the pointer for the task sheet and access a specific task sheet only by the task sheet ID.

As described above, since the task sheet contains the pointer for the related task, as the invention set forth in an eleventh aspect for example, if the transfer means transmits and receives the task sheets through communication by means of electronic mails or the highper text transfer protocol (HTTP), or via a recording medium such as a floppy disk, the system is able to control the workflow.

Further, when the transfer means receives a task sheet, on the basis of the task control information as a result obtained by converting the task sheet, the system senses the generation of the task and executes this. Therefore, it becomes possible to start the workflow system by a task sheet transferred through, for example, an electronic mail, and it becomes possible to operate workflows on a wide area network, which exceed the range of a local area network that one equipment for controlling the tasks of the workflow can control.

It is possible to generate a compound task sheet as a compound document including the duplicates of the electronic documents and the electronic document parts specified by the electronic document pointer information, or to convert the compound task sheet in reverse into the electronic documents and the electronic document parts and the task control information. To transfer a compound task sheet enables not only the electronic documents related to the tasks to collectively be transferred, but also the task control information of the related tasks to be held as a link. Therefore, by tracing this link, the user can sequentially refer to the related task sheets lying in the original storage location even from the external network to which the task is transferred, and get information on the history and progress state of the workflow. Further, since the system guarantees to recover the original state, the user can integrate the task control information and the related electronic documents into one file as a compound task sheet and can easily transfer the file collectively. Further, the user can trace the electronic documents and the electronic document parts contained in the compound task sheet from the task control information of the workflow, and can easily take out these.

When converting the task control information into the task sheet, the conversion means converts the electronic document pointer information indicating the storage area for the electronic documents and the electronic document parts contained in the task control information into the description of the input form area by the markup language, and the information inputted in the input form area is designed so as to be stored in the storage area; and thereby, it becomes possible to add, input, and store the information, the other task sheets, and electronic documents, which can be referred to or taken out directly from the task sheet after the task sheet is generated.

On the contrary, when converting the task sheet containing the input form area into the task control information, the conversion means converts the description of the input form area into the electronic document pointer information as the pointer for the area to store information inputted in the input form area; and thereby, it becomes possible to convert the task sheet containing the input form into the control information of the workflow system, and also possible to refer to or to take out the contents inputted on the task sheet from the workflow system. Further, a plurality of task sheets can share the area for storing the input information of the input form by this conversion.

What is claimed is:

1. A system for supporting a workflow operation in a distributed system having a plurality of local systems, at least one local system of the plurality of local systems including:

task control information storage means for storing task control information, wherein the task control information includes at least a task table and a process table; and transfer means for transferring the task control information between the at least one local system and other local systems of the plurality of local systems, wherein the task table includes first task information identifying each task assigned to the at least one local system and the process table includes information identifying relationships between the first task information and second task information corresponding to related tasks assigned to at least one of the other local systems of the plurality of local systems.

2. The system according to claim 1, the at least one local system further comprising:

open-document storage means for storing open-documents opened in the distributed system network; and conversion means for converting the task control information stored in the task control information storage means to a task sheet, the task sheet including a pointer to a related task sheet of a related task and for storing the task sheet in the open-document storage means, wherein the transferring means transfers the task sheet.

3. The system according to claim 2, wherein the converting means converts the task sheet stored in the open-document storage means to the task control information and stores the task control information in the task control information storage means.

4. The system according to claim 2, wherein the task sheet is an electronic document described according to a markup language.

5. The system according to claim 4, wherein the task control information contains electronic document pointer information indicating a storage area for an electronic document referred to or written in a task, the conversion means converts the electronic document pointer information, indicating a storage area for an electronic document contained in the task control information, into a description in an input form area using the markup language, and an information inputted in the input form area is stored in the storage area.

6. The system according to claim 4, wherein the task control information contains electronic document pointer information indicating a storage area for an electronic document referred to or written in a task, and wherein when the conversion means converts the task sheet into the task control information, if the task sheet contains an input form division described according to the markup language, the conversion means converts the task sheet into the electronic document pointer information.

7. The system according to claim 2, wherein the task sheet has a unique task sheet ID in the distributed system network, and a task sheet pointer for the task sheet is the task sheet ID.

8. The system according to claim 2, wherein the transfer means transmits and receives the task sheet through communication by means of electronic mail, the hyper text transfer protocol (HTTP), or via a recording medium.

9. The system according to claim 2, wherein when the transfer means receives a task sheet, the system senses a generation of a corresponding task and executes the corresponding task on the basis of the task control information being a result obtained by converting the task sheet.

10. The system according to claim 2, wherein the task control information contains electronic document pointer information indicating an electronic document referred to or written in a task or a storage area for the electronic document and the conversion means generates a compound task sheet as a compound document including a duplicate of an electronic document specified by the electronic document pointer information.

11. The system according to claim 2, wherein the task control information contains electronic document pointer information indicating an electronic document referred to or written in a task or a storage area for the electronic document, the conversion means divides a compound task sheet, the compound task sheet including the task sheet and a duplicate of an electronic document, into a task sheet division corresponding to the task sheet and an electronic document division, stores an electronic document contained in the electronic document division in the open document storage means, converts the task sheet division into task control information and stores a pointer for the electronic document stored in the open document storage means as the electronic document pointer information in the task control information.

12. The system according to claim 1, wherein the process table represents an upper-lower relationship between the first task information and the second task information.

13. The system according to claim 1, wherein the process table represents a former-later relationship of the first task information and the second task information.

14. The system according to claim 1, wherein the task control information contains electronic document pointer information indicating a storage area for an electronic document referred to or written in a task or related task.

15. The system according to claim 1, wherein the task control information contains a variable corresponding to an electronic document referred to or written in a task or related task, and further contains variable information such that the variable is coordinated with a pointer indicating the area capable of storing the electronic document.

16. The system according to claim 1, wherein the task control information contains electronic document pointer information indicating an electronic document referred to or written in a task or related task.

17. The system according to claim 16, wherein the electronic document has a unique document-ID in the distributed system network, and the electronic document pointer information is the document-ID.

18. A workflow support method for supporting a workflow operation in a distributed system network having a plurality of local systems, the method comprising:

storing task control information in a task control information storage device, wherein the task control information includes at least a task table and a process table; and transferring the task control information between the local systems, wherein the task table includes first task information identifying each task assigned to one local system of the plurality of local systems and the process table includes information identifying relationships between the first task information and second task information corresponding to related tasks assigned to at least one other local system of the plurality of local systems.

19. The method according to claim 18, further comprising:

storing open-documents opened in the distributed system network in an open-document storage device;

converting the task control information stored in the task control information storage device to a task sheet, the task sheet including a pointer to a related task sheet of a related task; and storing the task sheet in the open-document storage device, wherein transferring the task control information includes transferring the task sheet.

20. The method according to claim 19, wherein converting the task control information includes converting the task sheet stored in the open-document storage device to the task control information and storing the task control information in the task control information storage device.

21. The method according to claim 19, wherein the task sheet is an electronic document described according to a markup language.

22. The method according to claim 19, wherein the task sheet has a unique task sheet ID in the distributed system network, and a task sheet pointer for the task sheet is the task sheet ID.

23. The method according to claim 21, wherein transferring the task control information includes transmitting and/or receiving the task sheet through communication by means of electronic mail, the hyper text transfer protocol (HTTP), or via a recording medium.

24. The method according to claim 23, wherein when a task sheet is received, a corresponding task is executed on the basis of the task control information being a result obtained by converting the task sheet.

25. The method according to claim 19, wherein the task control information contains electronic document pointer information indicating an electronic document referred to or written in a task or a storage area for the electronic document and a compound task sheet is generated as a compound document including a duplicate of an electronic document specified by the electronic document pointer information.

26. The method according to claim 18, wherein the process table represents an upper-lower relationship between the first task information and the second task information.

27. The method according to claim 18, wherein the process table represents a former-later relationship of the first task information and the second task information.

28. The method according to claim 18, wherein the task control information contains electronic document pointer information indicating a storage area for an electronic document referred to or written in a task or related task.

29. The method according to claim 18, wherein the task control information contains a variable corresponding to an electronic document referred to or written in a task or related task, and further contains variable information such that the variable is coordinated with a pointer indicating an area capable of storing the electronic document.

30. The method according to claim 18, wherein the task control information contains electronic document pointer information indicating an electronic document referred to or written in a task or related task.

31. The method according to claim 30, wherein the electronic document has a unique document-ID in the distributed system network, and the electronic document pointer information is the document-ID.

32. A system for supporting a workflow operation comprising:

a task control information database that stores task control information, wherein the task control information includes at least a task table and a process table; and a network, comprised of at least two local systems, through which the task control information is transferred between a first local system and other local systems of the network, wherein the task table includes first task information identifying each task assigned to the first local system and the process table includes information identifying relationships between the first task information and second task information corresponding to related tasks assigned to at least one of the other local systems of the network.

* * * * *